United States Patent [19]

Pearson et al.

[11] 3,896,756

[45] July 29, 1975

[54] DEPTH CONTROL APPARATUS FOR TOWED UNDERWATER CABLES

[75] Inventors: Raymond H. Pearson; Thomas E. White, both of Richardson; James R. Perkins, Dallas, all of Tex.

[73] Assignee: Whitehall Electronics Corporation, Dallas, Tex.

[22] Filed: Feb. 2, 1971

[21] Appl. No.: 112,002

[52] U.S. Cl. .......................... 114/235 B; 340/7 PC
[51] Int. Cl. ............................................ B63b 21/56
[58] Field of Search ................ 114/235 B; 340/7 PC

[56] References Cited
UNITED STATES PATENTS

| | | | |
|---|---|---|---|
| 3,375,800 | 4/1968 | Cole et al. | 114/235 B |
| 3,434,446 | 3/1969 | Cole | 114/235 B |
| 3,648,642 | 3/1972 | Fetrow et al. | 114/235 B |

*Primary Examiner*—Trygve M. Blix
*Assistant Examiner*—Barry L. Kelmachter
*Attorney, Agent, or Firm*—Mason, Fenwick & Lawrence

[57] ABSTRACT

An apparatus for maintaining at a predetermined depth a tow cable, such as that of a seismic streamer, being towed by a vessel, the apparatus having one or more depth controller devices attached to the cable at spaced intervals therealong and a remote command transmitter on the tow vessel for transmitting commands to the depth controller devices, the depth controller devices having a mechanism responsive to deviations between the commanded depth of the cable and its actual depth for moving diving planes of the controller devices to cause the controller devices to move to the commanded depth as the cable is towed along by the vessel.

8 Claims, 9 Drawing Figures

PATENTED JUL29 1975　　3,896,756

SHEET 1

DEPTH CONTROL APPARATUS FOR TOWED UNDERWATER CABLES

This invention relates to apparatus for controlling the depth in water of a cable being towed by a tow vessel.

An object of this invention is to provide a new and improved apparatus for controlling the depth in water of a cable being towed by a vessel, such as a seismic streamer having one or more seismic devices connected to the cable for detecting seismic vibrations.

Another object is to provide an apparatus, of the type described, having one or more depth controller devices attached to the cable at spaced locations therealong, the controller devices having diving planes pivotal about horizontal axes and operator means for moving the planes to control upward and downward movement of the controller devices and therefore of the tow cable as the tow cable is moved through the water.

Still another object is to provide an apparatus, of the type described, wherein the operator means for moving the planes comprises a piston biased in one direction by the hydrostatic pressure of the water and in the opposite direction by a biasing means, such as springs, the piston being connected to the pivot shaft of diving planes by a suitable linkage.

A further object is to provide an apparatus, of the type described, having drive means for varying the force with which the springs bias the piston.

A further object of the invention is to provide an apparatus, of the type described, wherein each of the controller devices has means for receiving control signals transmitted by a command transmitter on the tow vessel and control means responsive to the command signals for operating the drive means.

A still further object is to provide a control system for a motor, such as the motor used to move the operator means of a depth controller device, from a remote location, such as the tow vessel, wherein the command signals are in the form of bursts of pulses of a predetermined frequency with the time interval or time delay between successive bursts indicating the commanded depth.

A still further object is to provide a control system of the type described having means for varying the time delay between successive bursts.

A still further object is to provide a control system of the type described having means for automatically varying the time delay or interval between successive bursts at a predetermined continuous rate.

An important object os the invention is to provide a control system, of the type described, wherein each of the controller devices includes an electro-mechanical servo loop responsive to the operation of the motor for arresting operation of the motor when the operator means attains a commanded position.

Another object is to provide a control system, of the type described, wherein the electro-mechanical servo loop system comprises a followup transducer driven by the motor and circuit means for comparing an electric quantity of the transducer with the time delay between the bursts of pulses for arresting operation of the motor when the motor has been driven to a predetermined position in accordance with the command signals.

Still another object is to provide a control system, of the type described, wherein the controller devices have a hydro-mechanical servo loop for moving the diving planes to a substantially neutral position wherein the controller device moves horizontally in the water when the controller device attains the commanded depth.

Another object of the invention is to provide a control system, of the type described, wherein the hydromechanical loop comprises a piston biased in one direction by the hydrostatic pressure of the water, the diving planes being linked to the piston and being movable thereby, and spring means for biasing the piston in the opposite direction, the piston and the diving planes moving to neutral position when the force of the water pressure on the piston equals the force exerted on the piston by the springs.

Another important object is to provide a new and improved depth controller device for a cable towed by a vessel.

Another object is to provide a depth controller device having diving planes movable by a piston for causing the depth control to descend or rise in the water as it is moved therein by the cable to which it is secured.

Still another object is to provide a depth controller device, of the type described, having a piston for moving the diving planes, the piston being biased in one direction by the hydrostatic force of the water and in the opposite direction by spring means, the controller device having means for varying the force with which the springs bias the piston, the diving planes moving to neutral position to cause the controller device to have zero vertical lift when the force of the hydrostatic force equals that of the spring means.

Additional objects and advantages of the invention will be readily apparent from the reading of the following description of a device constructed in accordance with the invention, and reference to the accompanying drawings thereof, wherein:

Referring now to FIGS. 1 through 6 of the drawing, the apparatus 20 embodying the invention for controlling the depth of a tow cable C being towed at a desired depth below the surface of the water at a predetermined speed by a towing vessel V includes a plurality of depth controller devices 21a–21n which are secured at desired spaced intervals along the cable. The controller devices having diving planes 22 pivotal about horizontal axes for maintaining the cable at a desired depth. The inclination of the diving planes determines the direction of vertical movement of the controller devices. The controller devices, as will be explained below, have a slightly positive buoyancy.

Figures 1, 2, 3:
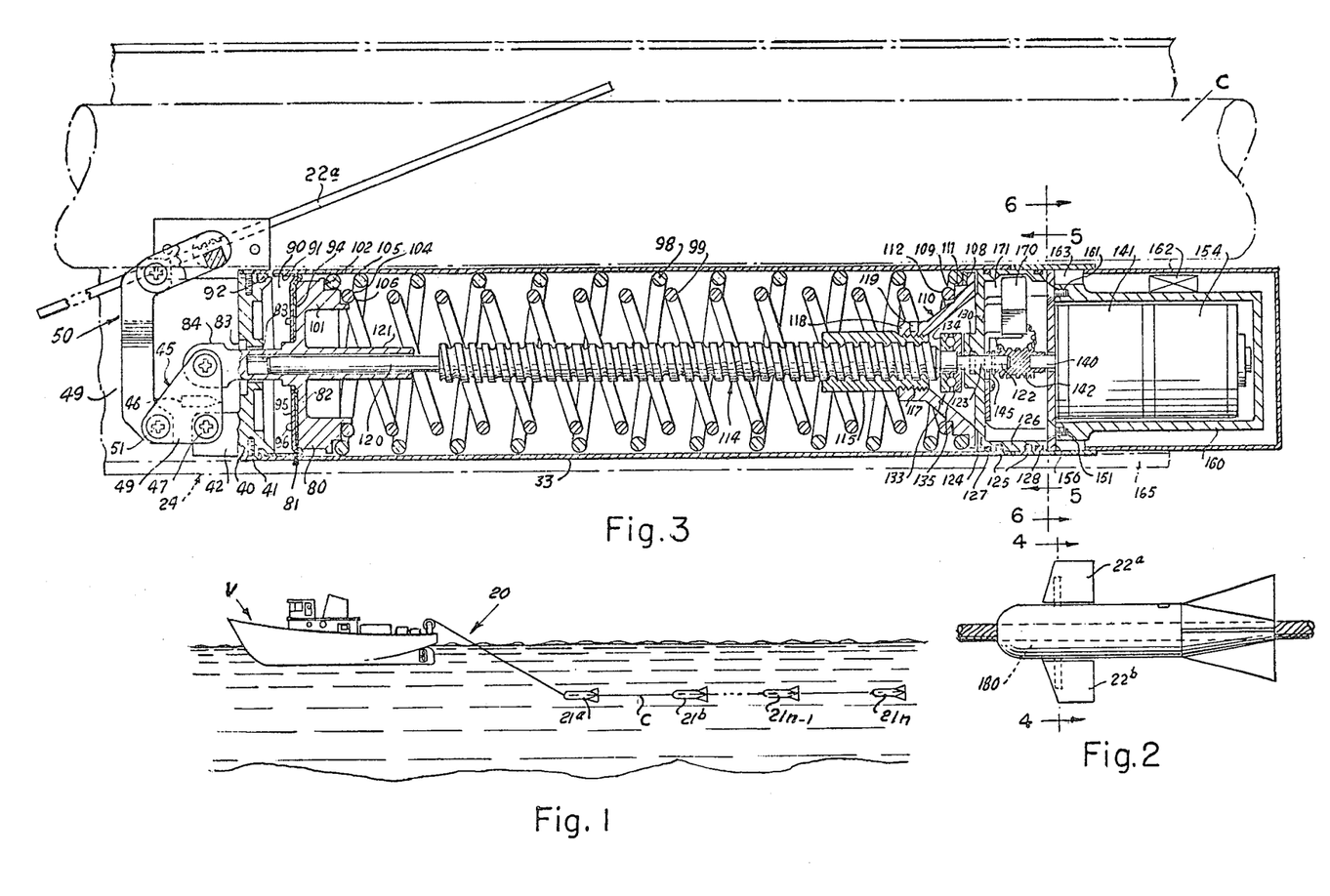
FIG. 1 is a view of the apparatus embodying the invention showing the controller devices secured to a cable being towed by a vessel.
FIG. 2 is a top view of a controller device.
FIG. 3 is a fragmentary longitudinal sectional view of a controller device embodying the invention.
Figure 4:
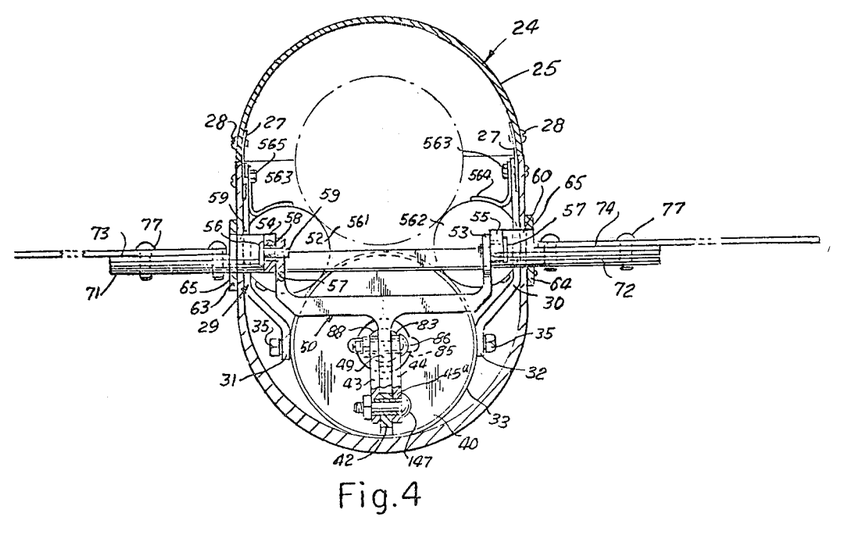
FIG. 4 is a vertical sectional view of the controller device taken on line 4—4 of FIG. 2.
Figure 5:
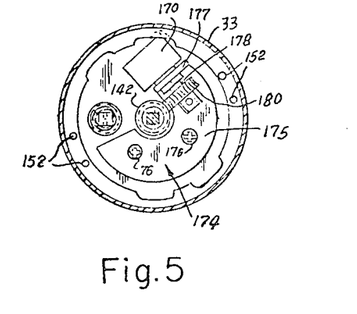
FIG. 5 is a sectional view taken on line 5—5 of FIG. 3.
Figure 6:
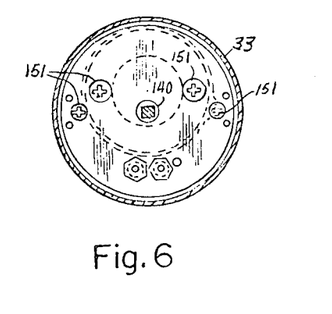
FIG. 6 is a sectional view taken on line 6—6 of FIG. 3.

Each of the depth controller devices 21 includes a shell 24 formed of a top section 25 and a bottom section 26 which are connected by a plurality of brackets 27 and screws 28. A pair of side frames 29 and 30 are connected by means of screws to the bottom shell. The frames 29 and 30 have downwardly and inwardly curved lugs or extensions 31 and 32, respectively, which abut a cylindrical operator housing 33 at opposite locations thereon. The housing is secured to the frame extensions in any suitable manner, as by screws 35.

The operator housing is closed at one end by a circular front bulkhead or wall 40 which is telescoped in the front end of the housing and is secured thereto by means of a plurality of screws 41 which extend through suitable apertures of the housing into suitable threaded peripheral bores of the end wall.

The front end wall is provided with a forwardly projecting lug 42 to which the triangular shaped side plates 43 and 44 of a link 45 are pivotally secured by means of a bearing sleeve 45a which extends through suitable aligned apertures in the side plates and the lug 42. The side plates of the link 45 are connected by a connector portion 46 integral therewith. A bolt 47 extends through the bearing sleeve to secure the link 45 to the lug 42. The forward lower ends of the link plates are connected to the lower end of the dependant leg 49 of a link 50 by a bolt 51. The upper end of the link 50 is provided with a pair of spaced upwardly extending arms 52 and 53.

The arms 52 and 53 of the link 50 are pivotally connected to the radially extending arms 54 and 55 of a shaft 55 by means of pivot pins 56 and 57, respectively. The pivot pin 56 extends through a sleeve bearing 58 positioned in an appropriate aperture in the shaft arm 54 and has a reduced threaded portion 59 which is threaded in a suitable threaded aperture of the arm 52. The pivot pin 57 similarly pivotally secures the shaft arm 55 to the link arm 53.

The shaft has circular bearing portions 59 and 60 journaled in bearing plates 63 and 64 which are rigidly secured on the outer side of the bottom shell section and to the side frames 29 and 30 by means of screws 65.

The opposite outer end portions 71 and 72 of the shaft are substantially semi-circular in cross section and have flat surfaces 73 and 74 to which the diving planes 22a and 22b are rigidly secured by means of screws 77 which extend through suitable apertures in the planes into threaded bores of the shaft.

The link 45 is pivoted about the axis of the bolt 47 by a piston 80 of a piston assembly 81. The piston 80 has a circular wall 82 from which projects forwardly a rod 83 whose flat outer end 84 extends between the side plates of the link 45 above the connector portion 46 thereof and is pivotally secured thereto by means of a bearing sleeve 85 which extends through suitable aligned recesses in the side plates and the flat end portion of the piston and a screw 86 which extends through the sleeve bearing. The piston rod 83 extends through a central aperture 88 of the front end wall 40, the aperture being substantially greater than the circumference of the piston rod so that the fluid pressure of the water is admitted to the chamber 90 between the front end wall 40 and the piston 80.

A tubular flexible diaphragm 91 has an internal annular flange 94 which is received in an external recess of the front end wall so that the front end of the diaphragm is held in seal tight relationship between the front end wall and the housing 33. The rear portion 94 of the diaphragm abuts the front end of the circular wall 82 of the piston and is rigidly secured thereto by an annular retainer 95 which is secured to the piston 80 by screws 96. The compression exerted by the retainer 95 and screws 96 causes the rear or inner end portion 94 of the diaphragm to be connected in seal tight relationship to the piston 80.

The piston 80 is biased forwardly in the cylinder by a pair of springs 98 and 99 against the force of the fluid pressure in the chamber 90 exerted on the piston and the diaphragm.

The outer spring 98 has a forward end portion which extends about the annular flange 101 of the piston and engages an outer annular stop surface 102 thereof. The inner spring 99 similarly extends about the flange 101 and engages an inner annular stop surface 104 thereof. The annular surfaces 105 and 106 of the piston flange 101 limit lateral movement of the inner ends of the springs. The rear ends of the outer and inner spring engage the shoulders 108 and 109, respectively, of a spring carrier 110, the engagements of the inner and outer springs with the surfaces 111 and 112 of the spring carrier limiting the lateral movement of the rear ends of the springs relative to the spring carrier.

The spring carrier is movable reciprocably in the cylinder 33 by a drive screw 114 which is threaded in a sleeve 115. The sleeve 115 has an inner end portion 117 which is threaded in the inner reduced end portion 118 of the spring carrier. A suitable set screw 119 may be used to prevent rotation of the sleeve relative to the spring carrier. The spring carrier is held against rotation by the friction between the carrier and the springs. The opposite ends of the springs are rigidly secured to the carrier and the piston to prevent rotation of the carrier.

The forward end of the drive screw 114 is supported against lateral deflection by the piston, the forward reduced end portion 120 of the drive screw being slidably received in a bore 121 of the piston.

The rear reduced end portion 122 of the drive screw is rotatably supported in the central passage 123 of a middle wall or bulkhead 124 disposed in the cylindrical housing 33 and rigidly secured thereto by screws 125 which extend through suitable apertures of the housing into blind bores of the annular peripheral flange 126 of the middle wall. A pair of O-rings 127 and 128 disposed in external annular recesses of the flange 126 seal between the flange and the cylindrical housing 33.

The middle wall is provided with an internal annular recess in which a packing and lubricant 130 is disposed which seals between the reduced rear end portion of the drive screw and the middle wall. A thrust bearing assembly 133 is disposed between the annular shoulder 134 of the drive screw and the annular shoulder 135 of the middle wall.

The inner reduced end portion 122 of the drive screw is rigidly secured to the output shaft 140 of a speed reducing transmission 141 by a worm gear 142. The end portion 122 of the drive screw is telescoped in a blind end bore of the worm gear and is rigidly secured thereto by a dowel 145, similarly. The output shaft of the speed reducig transmission 141 which is of noncircular cross section shape, e.g., square, extends into an oppositely opening blind bore of the worm gear of similar shape and thus nonrotatably connected to the worm gear.

The housing of the transmission is rigidly secured to a circular wall 150 by screws 151. The wall 150 in turn is secured to the rear end of the flange 126 of the middle wall 124 by screws 152. The speed reducing transmission is commercially available as a part of an assembly with a direct current reversible motor 154. An end cover 160 extends over about the motor and transmission assembly and its inner end is secured to the wall 150 by screws 161. The electronic circuit assembly 162 for controlling operation of the motor is mounted in the space 163 between the operator housing and the cover 160. An end closure 165 closes the rear end of the operator housing and is secured thereto in such tight relation by screws or the like.

It will be apparent that if the motor is driven in one direction so that the transmission output shaft 140 rotates in a clockwise direction as seen in FIG. 4, the spring carrier is moved forwardly or to the left due to engagement of the threaded sleeve 115 with the drive screw 114 and that if it is rotated in the opposite counterclockwise direction, the spring carrier is moved rearwardly or to the right as seen in FIG. 3. As the spring carrier moves to the left, the inner and outer springs are compressed and the forward force exerted thereon on the piston 80 increases. This force of course is opposed by the force of the water pressure in the chamber 90 acting on the piston 80.

It will be apparent, therefore, that the piston 80 will move to the left until the force exerted thereon by the pressure of the water in the chamber 90 equals the force exerted thereon by the force of the springs 98 and 99. Since the pressure of the water exerted on the piston varies with the depth of the controlled device in the water and the force exerted by the springs varies with the degree of their compression between the piston and the spring carrier, the angle of inclination of the diving planes 22a and 22b secured to the shaft 53 may be adjusted or changed by rotating the drive screw 114 in one direction or the other and the piston is moved in one direction or the other by the force differential exerted thereon by the springs and the water pressure until the controller device moves to such depth as to cause the combined forces exerted by the water pressure and the diving planes on the piston to be equal to the force exerted by the springs 98 and 99.

In order to determine the rotated position of the drive screw and provide an electrical quantity which varies in accordance with the rotated position of the drive screw and therefore of the spring carrier on the drive screw, a potentiometer or variable resistance 170 is mounted in the chamber 171 between the walls 124 and 150 by means of a bracket whose arcuate base portion 175 abuts the wall 124 and is secured thereto by screws 176. The bracket has an outwardly projecting leg 177 to which the potentiometer housing is rigidly secured in any suitable manner. The resistance of the potentiometer is varied upon the rotation of its shaft 178 which of course causes movement of an electric contact 178 upon a resistance 179, FIG. 9. A gear 180 is rigidly secured to the shaft 178 and its peripheral teeth mesh with the worm gear 142.

It will be apparent of course that as the electric motor 154 is rotated in one direction or the other, the worm gear 180 is rotated in accordance therewith. It will also be apparent that the pitch of the worm gear and the number of revolutions of the worm gear are required to cause a substantially complete rotation of the gear 180.

The frictional forces between the drive screw and the threaded sleeve 115 and in the transmission are such that when the motor 154 is de-energized the spring carrier 110 will remain in any position to which it has been moved by the rotation of the drive screw. As a result, the drive system is irreversible except by the reversal of energization of the electric motor 154.

The depth controller devices 21a–21n are secured to the cable C at the desired locations therealong in any suitable manner which permits rotation of the controller devices about their longitudinal axes and the longitudinal axis of the cable while preventing their longitudinal movement of the cable.

The shell at its forward end is provided with floatation means such as expanded or foam plastic or the like to cause the depth controller devices to have a slightly positive buoyancy so that the depth controller device will tend to rush upwardly in the water unless a diving force is exerted on the diving planes as the depth controller device is moved forwardly in the water.

Figure 7:
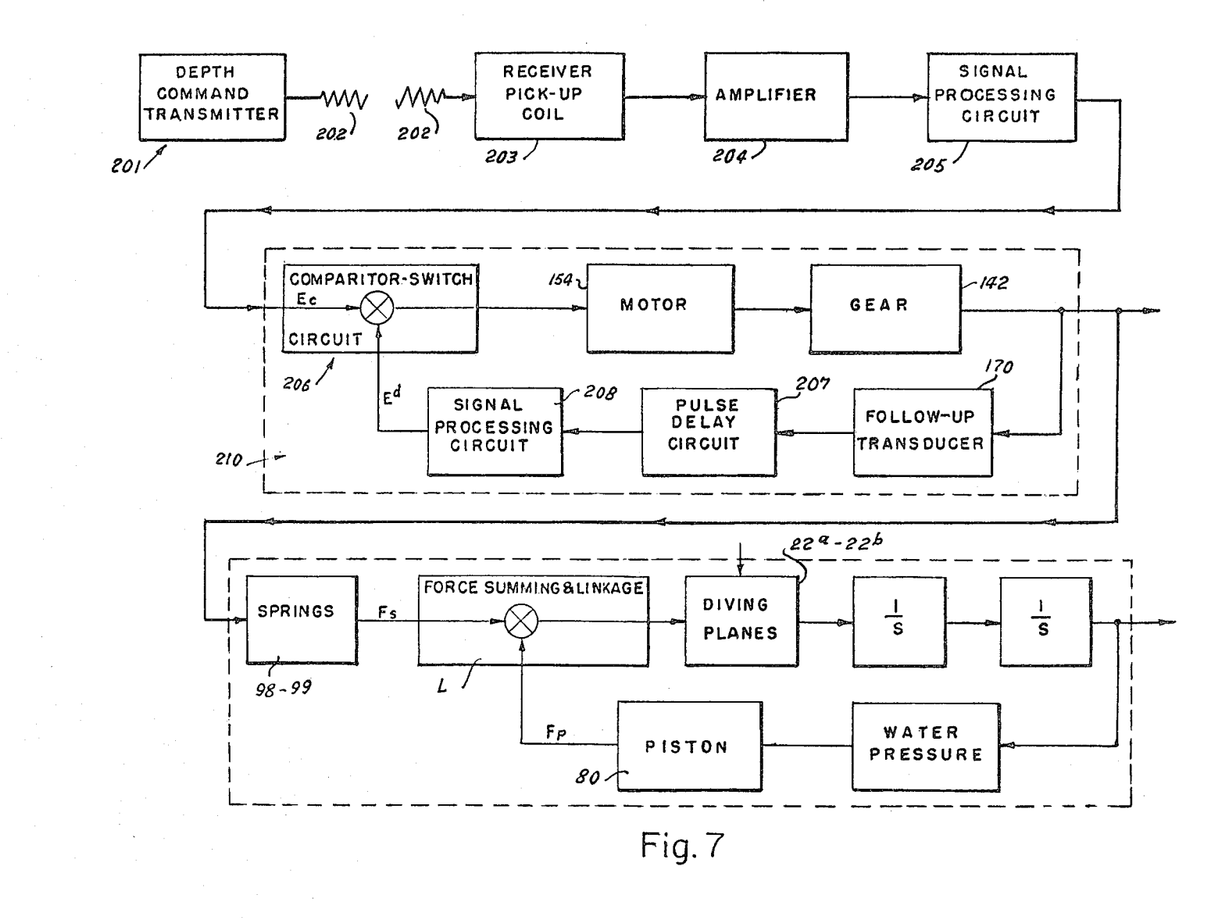
FIG. 7 is a block diagram of the control system of the apparatus embodying the invention.

Referring now particularly to FIG. 7 of the drawings, the control system of the apparatus includes a depth command transmitter 201 located on the tow vessel V for transmitting control signals in the form of bursts of pulses to the depth controller devices, preferably over a conductor which extends through the cable, although the transmission may be wireless. The signals are detected by a receiver pickup coil 203, in the circuitry package 162 amplified by an amplifier 204 and then transmitted to a signal processing circuit 205 which produces a control voltage C which varies in accordance with the time period between successive bursts of pulses of a predetermined frequency transmitted by the command transmitter. The control voltage is transmitted to a comparator switch circuit 206 where the control voltage Ec is compared with a voltage Ed which varies in accordance with the position of the movable contact 178 of the potentiometer or followup transducer 170 and therefore with the rotational position of the drive screw 114. This voltage Ed also varies in accordance with the depth of the controller device in the water since its depth is determined by the rotational position of the drive screw relative to spring carrier.

The output of a pulse delay circuit 207 varies in accordance with the position of the potentiometer contact 178 and is transmitted through a signal processing circuit 208 to the comparator switch circuit 206 which produces the voltage Ed.

The output of the comparator switch circuit 206 is used to energize the motor 154 and cause the drive screw 114 to be rotated to a predetermined position as commanded by the transmitter 201. Such energization of the motor will of course cause the potentiometer contact 178 to move in accordance with the rotation of the shaft until the voltage Ed becomes equal to the voltage Ec.

It will be apparent that the comparator circuit, the motor 154, the followup potentiometer or transducer 170, the pulse delay circuit 207 and the signal processing circuit 208 constitute a servo loop 210 which causes the motor to be energized and be driven in a proper direction until the drive screw 114 is moved to a desired or commanded position.

The rotational position of the drive screw 114, and therefore the position of the spring carrier relative to the drive screw, determines the value of the force Fs exerted on the piston 80 by the springs 98 and 99. It will be apparent that if the force Fs is greater than the combined force exerted on the piston by the water pressure in the chamber 90 and by the diving planes 22a and 22b through the linkage which includes the links 50 and 45, if the diving planes are not parallel to the longitudinal axis of the shell, the piston will be moved left, as seen in FIG. 3, and the diving planes will be pivoted in a counter-clockwise direction about the axis of the shaft 60 to a position inclined rearwardly and upwardly relative to the shell. The reaction forces of the water on the diving planes as the controller device is towed through the water will tend to move the controller device downwardly in the water thus moving the cable C downwardly therewith. As the controller device moves downwardly, the hydrostatic pressure in the chamber 90 increases as the depth of the controller device in the water and the piston 80 moves back to its intermediate or neutral position wherein the diving planes 22a and 22b are again parallel or substantially parallel to the longitudinal axis of the shell. At this time the further downward movement of the controller device is arrested and the controller device tends to move horizontally through the water as it is towed therethrough. Since the controller device may have a slightly positive buoyance, the diving planes may actually be slightly inclined upwardly and rearwardly about the axis of the shaft 60 in order to maintain a horizontal movement of the controller device through the water.

Conversely, if the force exerted by the springs 98 and 99 is less than the force exerted on the piston by the water pressure in the chamber 90, due to rotation of the drive screw in a direction which moves the spring carrier to the right as seen in FIG. 3, the piston 80 will be moved to the right thus pivoting the diving planes 22a and 22b in a clockwise direction about the axis of the shaft 60 so that the reaction forces between the water and the diving planes will cause the controller device to move upwardly in the water. As the controller device is thus moved upwardly in the water, the pressure in the chamber 90 will of course decrease and the piston will again move to the left pivoting the diving planes back to their position substantially paralel to the longitudinal axis of the shaft as the force exerted on the piston by the water pressure becomes equal to the force exerted on the piston by the springs.

It will be apparent that once the drive screw has been moved to a desired position to cause the controller device to move at a desired predetermined set depth below the surface of the water, if the controller device for some reason tends to rise above such depth, the hydrostatic pressure in the chamber 90 will be decreased thus causing counter-clockwise rotation of the diving plane shaft so that the depth controller device will again move upwardly back to the set or predetermined depth.

The force exerted on the piston 80 tending to move it to the right is substantially only the hydrostatic pressure in the chamber 90 when the diving planes are in position parallel to the longitudinal axis of the controller device. The force exerted on the piston by the diving planes and the piston, tends to exert a force to the right on the piston if the diving planes are pivoted in a counter-clockwise direction from their neutral position, i.e., when the controller device has moved above the set depth. If the controller device is being moved at a depth below the set depth, the force exerted by the diving planes on the piston tends to move the piston to the left somewhat offsetting the force of the hydrostatic pressure which is tending to move the piston to the right. In either case, the force exerted by the diving planes on the piston through the described linkage decreases as the planes approach their neutral position and becomes of zero value at the moment the planes reach their neutral position.

Figure 8:
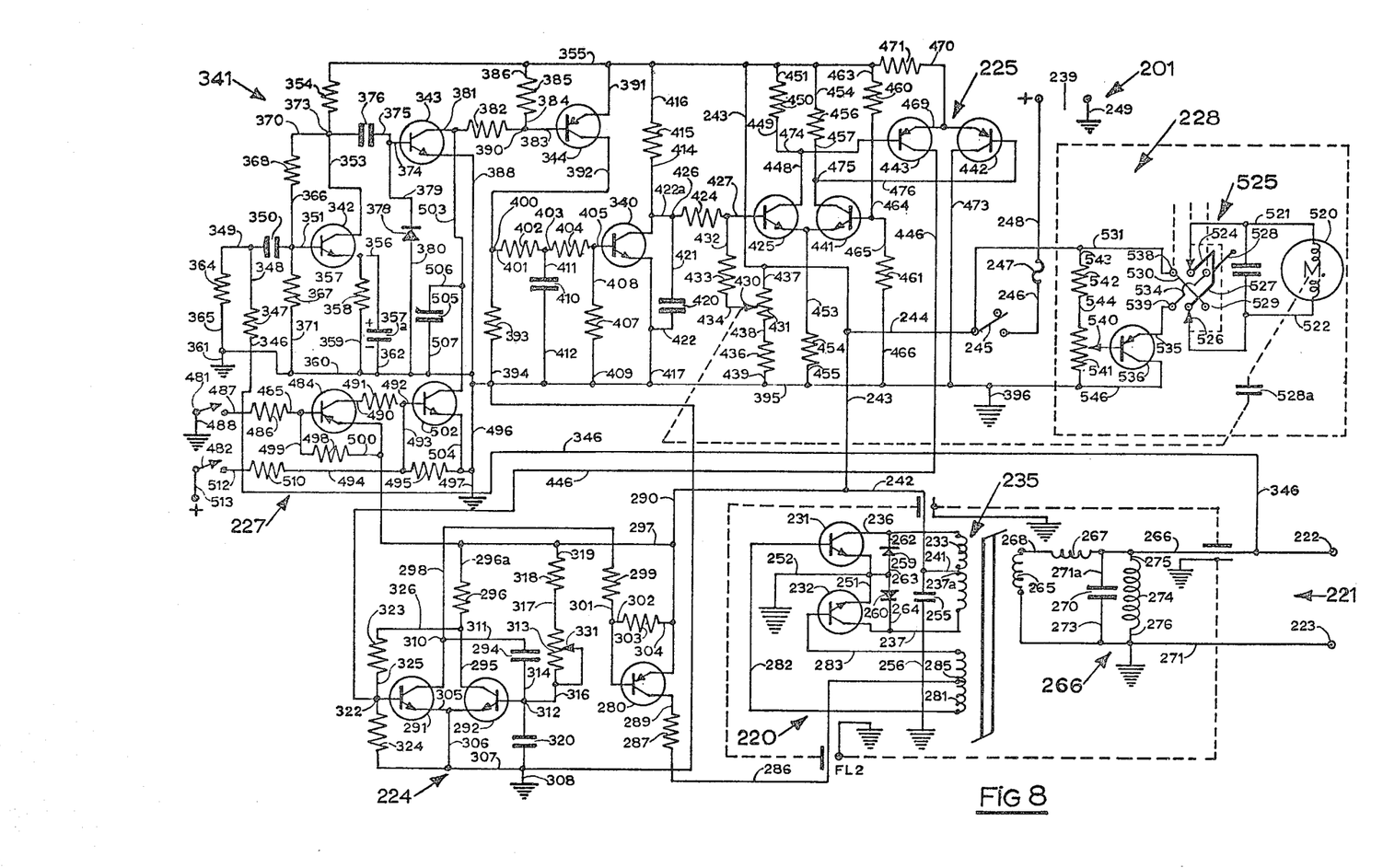
FIG. 8 is a diagrammatic illustration of the electric circuit of the command transmitter; and, FIG. 9 is a diagrammatic illustration of the electric circuit of the depth controller device.

Referring now to FIG. 8 of the drawing, the depth command transmitter 201 includes an oscillator 220 which provides, when operative, an output signal of a predetermined frequency, for example, IKHz to an output circuit 221, one terminal 222 of which may be connected to a suitable conductor which extends through the cable C and adjacent the pickup coils 203 of the several depth controller devices. The other terminal 223 of the output circuit may be connected to the tow vessel ground which of course is also in electrical connection with the water.

The duration of each period of energization of the oscillator 220 is controlled by a key circuit or one shot multivibrator 224 and the time intervals between successive operations of the multivibrator, and thus of the oscillator 220, is controlled by repetition rate control circuit 225.

The depth command transmitter 201 may also include an inhibit circuit 227 for preventing operation of the oscillator 220 at times when other equipment which is attached to the tow cable, is in operation and a rate control circuit 228 for automatically varying the depth at which the controller devices are moving at a predetermined rate. As, for example, to maintain the tow cable at a predetermined level above a sloping surface of the earth below the water when the vessel is moving parallel to the slop of the ground.

The oscillator 220 includes a pair of transistors 231 and 232 whose collectors are connected to opposite sides of the primary winding 233 of a transformer 235 by the conductors 236 and 237. The electrical midpoint or center tap 237a of the primary winding is connectible to the positive side of a power input circuit 239 by means of the conductors 240, 241, 242, 243 and 244, a manually operable switch 245, a conductor 246, a fuse 247 and a conductor 248. The other side of the input circuit is connected to ground by conductor 249.

The emitters of the transistors 231 and 232 are connected to the other ground side of the power input circuit 239 by the conductors 251, 252, ground and the conductor 249. A decoupling capacitor 255 is connected between the electrical midpoint of the primary winding 233 of the transformer 234 and ground by the conductors 241, 242 and 256. It will be apparent of course that the frequency of oscillation will be determined by the inductance and self capacitance of the transformer as well as that of the filter network connected across its secondary winding 265. Diodes 259 and 260 are connected reversely in series between the conductors 236 and 237 by the conductors 262, 263 and 264 and to ground by the conductors 263 and 252.

The transformer 235 has a square loop toroidal core so that the voltage induced in the secondary winding 265 of the transformer 235 is of square wave form. A wave shaping circuit 266 changes the square wave output of the secondary winding 265 to a sine wave output for transmittal to the output circuit 221 and includes an inductance 267 connected between the output terminal 222 and one end of the secondary winding by the conductors 268 and 266, a capacitor 270 connected across the conductors 266 and 271 by the conductors 272 and 273, and an inductance 274 connected across the conductors 266 and 271 by the conductors 275 and 276. The conductor 271 connects one side of the secondary winding 265 to the output circuit terminal 223.

The transistors 231 and 232 can be rendered conductive only when the emitter collector circuit of the output or control transistor 280 of the multivibrator 224 is non-conductive since the bases of the transistors 231 and 232 are connected to the opposite ends of a secondary winding 281 of the transformer 234 by the conductors 282 and 283 and the electrical midpoint or center tap 285 of the secondary winding 281 is connectible to the positive side of the input circuit through the conductor 286, a resistance 287, a conductor 289, the emitter collector circuit of the transistor 280, the conductors 290, 243 and 244, the switch 245, the conductor 246, the fuse 247 and the conductor 248.

It will be apparent that the oscillator 220 is of a type well known to those skilled in the art and that as long as the emitter collector circuit of the control transistor 280 is non-conductive, the emitter collector circuits of the two transistors 231 and 232 are rendered alternately conductive. The oscillator 220 of course is provided with suitable shielding.

The one-shot multivibrator 224 may be of any suitable conventional type and includes a pair of transistors 291 and 292. The emitter collector circuit of the control transistor 280 is rendered non-conductive each time the emitter collector circuit of the multivibrator first transistor 291 is conductive. Each time the emitter collector circuit of the multivibrator first transistor is rendered conductive, the multivibrator second transistor 292 is rendered non-conductive and remains non-conductive until the electrical charge on a capacitor 294 discharges. The period of time necessary to discharge the capacitor 294 to the value at which the emitter collector circuit of the second transistor 292 is rendered conductive, and thus renders the first transistor 291 non-conductive, determines the period of duration of each period of operation of the oscillator 220.

The collector of the transistor 292 is connected to the positive voltage conductor 242 through a conductor 295, current limting resistance 296 and the conductors 296a, 297 and 290. The collector of the transistor 291 is connected to the positive voltage conductor 242 through the conductor 298, a resistance 299, the conductors 301 and 302, a resistance 303 and the conductors 304 and 290. The emitters of the transistors 291 and 292 are connected to ground through the conductors 305, 306, 307 and 308.

The capacitor 294 is connected to the common connection 310 of the resistance 299 and the collector of the transistor 291 by a conductor 311 and to the common connection 312 of a variable resistance 313 and the base of the transistor 292 by a conductor 314. The resistance 331 is connected between the base of the transistor 292 and the positive voltage conductor 242 by the conductors 316 and 317, a resistance 318 and the conductors 319 and 297. A capacitor 320 is connected between ground and the common connection 312 to filter extraneous noise from the base of the transistor 292. A biasing potential is applied to the base of the transistor 291 since it is connected to the common connection 322 of the resistances 323 and 324 connected in series with the resistance 296 across ground and the positive voltage conductor by the conductors 308, 307, 325, 326, 295, 296a, 297 and 242.

It will be apparent that each time the emitter collector circuit of the first transistor 291 of the multivibrator 224 is rendered conductive by a pulse transmitted to its base from the pulse repetition control circuit 225, the voltage at the common connection 310 drops toward ground thus causing the charge on the capacitor 294 and thus at the base of the second transistor 292 to move toward a negative voltage value thus rendering the emitter collector circuit of the transistor 292 non-conductive. The transistor 292 will again be rendered conductive when the charge at the common connection 312 again rises to a value at which the transistor 292 is turned on. The period of time required to discharge the capacitor 294 is determined by the combined values of the resistances 313 and 318. The value of the resistance 313 may of course be varied by adjusting the position of its movable contact 331 on the resistance 313.

It will be apparent therefore that the duration of the period of operation of the oscillator each time that a positive going pulse applied to the base of the first transistor 291 of the multivibrator may be varied by adjusting the position of the control 331 of the variable resistance 313. When the second transistor 292 is again rendered conductive, the first transistor 291 is rendered non-conductive until it is again rendered conductive by a pulse transmitted to its base from the pulse repetition rate control circuit 225. The control transistor 280, of course, remains non-conductive during the period of time the first transistor is conductive and thus the oscillator 220 is operative during this period.

The time period between successive energizations of the first transistor 291 of the multivibrator and therefore the time period or time delay between successive bursts of pulses produced by the oscillator 220, is controlled by the repetition rate control circuit 225 which in turn is responsive to the termination of each burst of pulses generated by the oscillator 220.

The output of the oscillator 220 is transmitted to the base of the first or input transistor 340 of the pulse repetition rate control circuit 225 through a buffer and pulse shaping circuit 341 which includes the transistors 342, 343 and 344. The output of the oscillator 220 is transmitted to the base of the transistor 342 through the conductors 266 and 346, a resistance 347, the conductors 348 and 349, a capacitor 350 and the conductor 351. The emitter collector circuit of the transistor 342 is connectible across the power input circuit to 239, its collector being connected through the conductor 353, the resistance 354 and conductor 355 to the positive voltage conductor 243 and its emitter being connected to ground through the conductors 356 and 357, the resistance 358 and the conductors 359, 360 and 361. A filter capacitor 357 is also connected between the emitter and ground by the conductors 356, 362, 360 and 361. A resistance 364 is connected between the capacitor 350 and ground by the conductors 349, 365, and 361.

Biasing potential is applied to the base of the transistor 342 since the conductor 351 is connected to a conductor 366 which connects the resistances 367 and 368 which are connected in series between the positive voltage conductor 355 and the ground conductor 360 by the conductors 353, 370, 366 and 371.

The output of the transistor 342 is transmitted to the base of the second transistor 343 of the buffer and shaping circuit 341, the base of the transistor 343 being connected to the common connection 373 of the resistance 354 and the collector of the first transistor 342 through the conductors 374 and 375, a blocking capacitor 376 and the conductor 370. A protective diode 378 is connected between the base of the transistor 343 and the ground conductor 360 by the conductors 379 and 380.

The emitter collector circuit of the second transistor 343 is connectible across the input circuit since its collector is connected to the positive voltage conductor 355 by the conductor 381, a resistance 382 and conductors 383 and 384, a resistance 385 and a conductor 386, and its emitter is connected to the ground conductor 360 by the conductor 388. The output of the transistor 343 in turn is transmitted to the base of the third transistor 344 since the base of the third transistor is connected to the common connection 390 of the resistances 382 and 385 by the conductor 383.

The emitter collector circuit of the transistor 344 is also connectible across the power input circuit since its emitter is connected to the positive voltage conductor 355 by the conductor 391 and its collector is connected to ground through a conductor 392, a resistance 393 and the conductors 394, 395 and 396.

The buffer and pulse shaping circuit 341 converts each burst of pulses generated by the generator 220 into a switching pulse which is transmitted to the transistor 340 of the pulse repetition rate control circuit 225. The base of the input transistor 340 is connected to the common connection 400 of the collector of the transistor 344 and the resistance 393 by a conductor 401, a resistance 402, a conductor 403, a resistance 404 and a conductor 405. A biasing resistance 407 for providing a biasing potential to the base of the transistor 340 is connected between the base and the ground conductor 395 by the conductors 408 and 409. A filter capacitor 410 is connected between the ground conductor 395 and the common connection of the resistances 402 and 404, one side thereof being connected to the conductor 403 by conductor 4111 and its other side being connected to the ground conductor 395 by conductor 412.

The emitter collector circuit of the input transistor 304 is connectible across the power input circuit, its collector being connected to the positive voltage conductor 355 by a conductor 414, a resistance 415 and a conductor 416 while its emitter is connected to the ground conductor 395 by a conductor 417.

Each output pulse of the buffer and shaping circuit 341 produced upon the termination of each burst of pulses generated by the oscillator 220 renders the emitter collector circuit of the input transistor 340 conductive thus causing both sides of a capacitor 420 to be, in effect, connected to ground, one side of the capacitor 420 being connected to the collector of the input transistor 340 through the conductors 421, 422 and 414 and its other side being connected to the ground wire 395 through conductors 422a and 417.

The rate of charge of the capacitor 420 after the emitter collector circuit of the transistor 340 has been conductive determines the time period between successive pulses transmitted to the multivibrator 224 by the repetition rate control circuit 225. This time period extends from the time the transistor 340 becomes non-conductive until the time the potential at the base of the transistor 425 reaches a value at which the emitter collector circuit of the control transistor 425 is rendered conductive. The potential at the base of the control circuit varies in accordance with the charge on the capacitor 420 since the base of the transistor 425 is connected to the common connection 426 of the capacitor 420, the resistance 415 and the collector of the transistor 340 by a conductor 427, a resistance 424 and a conductor 422. The common connection of the base of the transistor 425 and the resistance 424 is connected to the adjustable contact 430 of a variable resistance 431 through the conductors 427 and 432, a resistance 433 and a conductor 434. The resistance 431 is connectible in series across the power input circuit 239 through a resistance 436 since the resistances 431 and 436 are connected across the positive voltage conductor 243 and the ground conductor 395 by the conductors 437, 438 and 439.

Each time the transistor 340 is rendered conductive, the condenser 420 discharges and the voltage at the base of the transistor 425 will drop and then when the transistor 340 is thereafter rendered non-conductive, the voltage at the base of the transistor 425 will begin to rise as the capacitor 420 charges at a rate determined by the setting of the contact 430 on the resistance 431. It will be apparent that the rate of charge will be decreased if the contact 430 is moved downwardly on the resistance 431 and will increase if it is moved upwardly thereon.

The transistor 441, 442 and 443 with the transistor 425 constitute a cascaded differential amplifier circuit with the output of the amplifier circuit being taken from the common connection 322 of the collector of the transistor 443 and the resistances 324 and 325, the collector being connected by the conductor 446 to the common connection 322 of the resistances 323 and 324.

The transistors 425, 441, 442 and 443 are connected in the conventional well known manner to form a cascaded differential amplifier. The emitter collector circuit of the transistor 425 is connectible across the input circuit 239, its collector being connected to the positive voltage conductor 355 by the conductors 448 and 449, a resistance 450 and a conductor 451 while its emitter is connected to the ground conductor 395 by the conductors 452 and 453, the resistance 354 and a conductor 455.

The emitter collector circuit of the transistor 441 similarly is connectible across the input circuit, its collector being connected to the positive voltage conductor 355 by the conductor 457, a resistance 458 and the conductor 459, while its base is connected to the ground wire 395 by a conductor 465, a resistance 461, and a conductor 466 and its emitter being connected to the ground wire 395 by the conductors 452 and 543, the resistance 454 and the conductor 455.

A biasing potential is applied to the base of the transistor 441 by a voltage divider network which includes a pair of resistances 460 and 461 connected in series across the positive voltage conductor 355 and the ground conductor 395 by the conductors 463, 464, 465 and 466, the common connection 467 of the two resistances being connected to the base of the transistor 441 by the conductor 465.

The emitters of the transistors 442 and 443 are connected to the positive voltage conductor 355 by the conductors 469 and 470 and the resistance 471. The collector of the transistor 443, as explained above, is connected to ground through the conductors 446 and 325, the resistance 324 and the conductors 307 and 308. The collector of the transistor 442 is connected to the ground conductor 395 by the conductor 473.

The base of the transistor 443 is connected to the common connection 474 of the resistance 450 and the collector of the transistor 425 while the base of the transistor 442 is connected to the common connection 475 of the resistance 458 and the collector of the transistor 441.

It will now be apparent that each time the transistor 443 is rendered conductive, the multivibrator 224 will render operative the oscillator 220 for a period of time predetermined by the setting of the contact 331 on the resistance 313 of the multivibrator 224 and that the output of the oscillator causes the transistor 340 to be rendered conductive, which then renders the transistor 425 non-conductive, and thereafter the transistor 425 becomes conductive after a time delay determined by the position of the contact 430 on the resistance 431. When the transistor 425 is again rendered conductive, the transistor 443 is again rendered conductive to transmit a pulse to the multivibrator 224 to initiate another period of operation of the oscillator.

The inhibit circuit 227 is used to inhibit operation of the depth command transmitter when either of the switches 481 or 482 are closed. The contacts 481 and 482 may be relay contacts and be closed whenever their associated coils are energized. The inhibit circuit includes a transistor 484 whose base is connectible to ground through a conductor 485, a resistance 486, a conductor 487, the control 481 and a conductor 488. The emitter collector circuit of the transistor 484 is connectible across the power input circuit 239, its emitter being connected to the positive voltage conductor 297 and its collector being connectible to ground through the conductor 490, a resistance 491, the conductors 492, 493 and 494, a resistance 495 and the conductors 496 and 497. A biasing potential is applied to the base of the transistor 484 through a resistance 498, one side of which is connected by a conductor 499 to the conductor 485, and thus to the common connection of the resistance 486 and the base of the transistor 484 and whose other side is connected to the positive voltage conductor 297 by the conductor 500. The other transistor 502 of the inhibit circuit 227 has its collector connected to the conductor 381, and thus to the common connection of the collector of the transistor 343 and the resistance 382, by a conductor 503 and its emitter is connected to ground through the conductors 504, 496 and 497. A filter capacitor 505 is connected at the collector emitter circuit of the transistor 502, one side thereof being connected to the conductor 503 by a conductor 506 and its other side being connected to ground through the conductors 507, 360 and 361.

A resistance 510 of the inhibit circuit has one side connected to one side of the resistance 495 by the conductor 494 and its other side is connected to a positive voltage input terminal 511 through a conductor 512, the contact 482 and a conductor 513.

It will be apparent that when the contact 481 is closed, the normally non-conductive transistor 484 is rendered conductive and it in turn renders conductive the transistor 502. When the transistor 502 is conductive, the transistor 343 is rendered non-operative and the transistors 484 and 502 will remain conductive until the contact 481 is again opened. Similarly, if the contact 482 is closed, the transistor 502 is rendered conductive and thus renders the transistor 343 inoperative.

The contacts 481 and 482 may be operated by suitable relay coils energized whenever any other components of the seismic apparatus associated with the cable C are placed in operation, as, for example, when the seismic data is being acquired by suitable hydrophones, not shown, which are also connected to the tow cable.

It is desirable if the cable is being towed in a body of water below which the earth surface slopes, that the level of the cable above the surface be parallel to water surface and that the cable move upwardly or downwardly as the vessel moves relative to the upwardly or downwardly sloping earth surface at a rate determined by the speed of the tow vessel and the degree of the slope so that the distance of the cable above the earth surface be substantially constant. This may be accomplished by the rate control circuit 228 which causes the contact 430 to move in one direction or the other on the resistance 431 at an adjustable predetermined rate so as to cause the cable to continue to move parallel above the sloped earth surface.

The circuit 228 includes a reversible direct current motor 520 whose direction of operation varies with the directional flow of the current across its conductors 521 and 522. The conductor 521 is connected as at 523 to one side of one movable contact 524 of a double pole, double throw switch 525 while its other conductor 522 is connected, as at 526, to the other movable contact 527 of the switch. When the movable contacts 524 and 527 of the switch are moved to the right where they engage the stationary contacts 528 and 529, respectively, of the switch, the conductor 522 is connectible to the positive side of the power input circuit 239 through the contacts 527 and 529, the conductors 530 and 531, the switch 245, the conductor 246, the fuse 247 and the conductor 248. Simultaneously, the other conductor 521 is connected to the other side of the input circuit through the stationary contact 528, the movable contact 524, the conductors 534 and 535, the emitter collector circuit of a transistor 536, the conductors 395 and 396, ground and the conductor 249. When the switch is moved to the left the movable contacts 524 and 527 engage the stationary contacts 538 and 539, respectively, of the switch and the conductor 522 is connected to ground through the contacts 527 and 539, the emitter collector circuit of the transistor 536, and the conductors 395 and 396 while the conductor 521 is connected to the positive side of the voltage since it is now connected through the contacts 524 and 538 to the conductor 531.

It will thus be seen that the direction of current flow through the motor may be reversed by moving the movable contacts of the double pole, double throw switch from one extreme position to the other and that when the switch is in an intermediate position the motor is not connected across the input circuit and is therefore inoperative.

The speed of rotation of the drive shaft of the direct current motor may be adjusted by varying the conductivity of the transistor 536 whose base is connected by a contact 540 to a resistance 541 connected in series with the resistance 542 across the conductors 531 and 395 and therefore across the input circuit 239 when the switch 245 is in its closed position, by the conductors 543, 544 and 546. The drive shaft of the motor 520 may be connected through any suitable mechanical linkage, which may include a clutch 548, to the movable contact 430 of a potentiometer which includes the resistance 431 and which may be rotated or moved in one direction when the motor is running in one direction and in the opposite direction at a rate controlled by the setting of the contact 540 on the resistance 541. The clutch 548 may be manually operated.

It will thus be apparent that the depth command transmitter is operational whenever the main switch 245 is moved to closed position and that the transmitter, as long as the switch 245 is in its closed position and both contacts 481 and 482 of the inhibit circuit 227 are in their open positions, will transmit bursts of pulses from the oscillator to the depth controller devices and that the interval or time delay between successive bursts of pulses will be determined by the position of the movable contact 430 on the resistance 431. It will further be seen that if either of the contacts 481 and 482 is closed, the transistor 343 will be rendered inoperative to control operation of the transistor 344 and thus of the transistor 340 which will then remain conductive keeping the repetition rate control circuit inoperative so that no pulse is transmitted over the conductor 446 to the multivibrator 224. As a result, the oscillator 220 is held inoperative so that no bursts of pulses are being transmitted to the depth controller devices which might interfere with the operation of the other seismic equipment. When the contacts 481 and 482 are opened, the depth command transmitter is placed in operation and will continue to send forth bursts of pulses with time delay or period between successive bursts being determined by the setting of the contact 430 on the resistance 431.

If it is desired to vary the depth of the controller devices at a predetermined rate to move them up or down in the water over a sloping ground surface beneath the body of water, the motor switch 525 is set in one extreme position or the other, the contact 540 is adjusted to cause the contact 520 to move at a predetermined speed when the clutch 548 is engaged so that the motor will now move the contact in a predetermined direction at a predetermined rate of speed. During the operation of the motor, the operation of the oscillator 220 will again be interrupted at any time that either the contact 481 or the contact 482 is in closed position.

It will thus be seen that the depth command transmitter sends forth bursts of pulses of predetermined length and of a predetermined frequency with the time delay or time period between successive bursts of pulses being determined and adjustable by the position of the contact 430 on the resistance 431.

Figure 9:
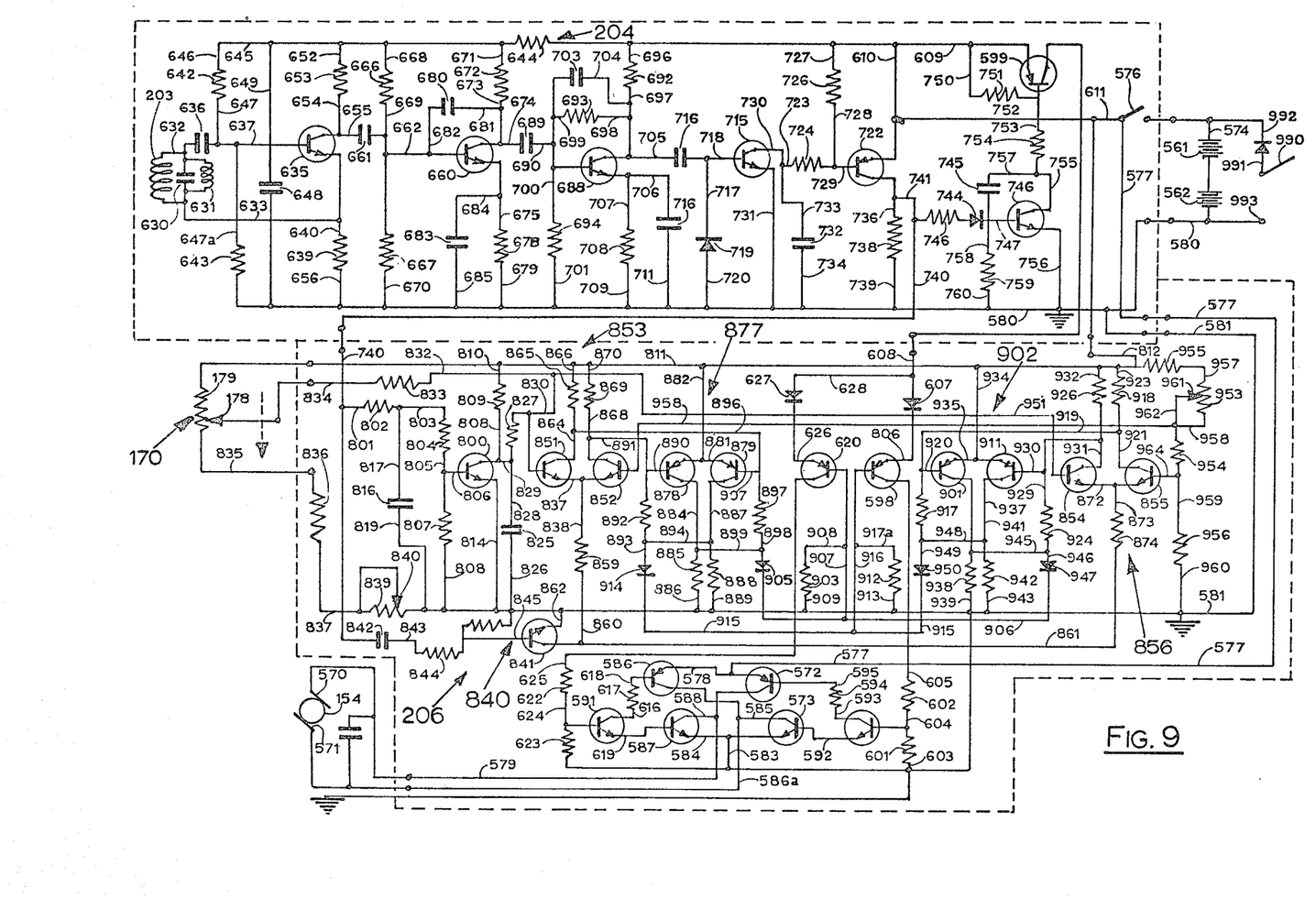

Referring now particularly to FIG. 9 of the drawing, the electro-mechanical servo loop 210 includes the motor 154 and the followup transducer 170 which is a potentiometer having the resistance 179 and the contact 178 which is movable The power for driving the motor 154 and energizing the various circuits of the electro-mechanical servo loop 210 is provided by a pair of batteries 561 and 562 which may be secured in the bottom shell section, FIG. 4, by the clamps 563 and 564 which are secured to the side frames 29 and 30, respectively, by screws 565 and 563, respectively.

The terminal 570 of the motor 154 is connected to the positive side of the battery 561 and the other terminal 571 thereof is connected to the negative side of the battery 562 when the emitter collector circuits of a pair of transistors 572 and 573 are conductive to cause the motor to operate in one direction.

When the transistors 572 and 573 are conductive, the motor terminal 570 is connected to the positive side of the battery 561 by the conductors 574 and 575, a switch 576, the conductors 577 and 578, the transistor 572 and the conductor 579 while its terminal 571 is connected to the negative side of the battery 562 by the conductors 580, 581, 582, 583 and 584, the transistor 573 and the conductors 585 and 586a. Conversely, the terminal 570 is connected to the negative side of the battery 562 and the motor terminal 571 is connected to the positive side of the battery 561 when the transistors 572 and 573 are non-conductive and another pair of transistors 586 and 587 are conductive to cause the motor to operate in the reverse direction. When the transistors 586 and 587 are conductive, the motor terminal 571 is connected to the positive side of the battery 561 through the conductor 586a, the emitter collector circuit of the transistor 586, and the conductors 578 and 577, the switch 576 and the conductors 575 and 574 while its other terminal 570 is connected to the negative side of the battery 562 through the conductors 579 and 588, the transistor 587, and the conductors 584, 583, 582, 581 and 580.

It will be apparent that if the motor is to rotate, in one direction to cause the diving planes to be positioned at such inclination as to cause the controller device to move upwardly in the water, both of the transistors 572 and 573 must be conductive and similarly, if the motor is to rotate in the opposite direction to cause the diving planes to move to such position as to cause the controller device to move downwardly in the water, both of the transistors 586 and 587 must be conductive while the other pair of transistors 572 and 573 are non-conductive.

The transistors 572 and 573 are rendered conductive only when a transistor 590 is rendered conductive and similarly, the transistors 586 and 587 are conductive only when a transistor 591 is conductive.

The emitter of the transistor 590 is connected to the base of the transistor 573 by a conductor 592 while its collector is connected to the base of the transistor 572 by the conductor 593, a resistance 594 and a conductor 595. As will be explained below, the transistor 590 is rendered conductive when the emitter collector circuits of a control transistor 598 and an enable transistor 599 are rendered conductive since the base of the transistor 590 is connected to the common connection of a pair of resistances 601 and 602 which are connectible in series across the batteries through the conductors 580, 581, 582, 603, 604 and 605, the control transistor 598, a diode 607, the conductor 608, the enable transistor 599 and the conductors 610 and 611, the switch 576 and the conductor 575.

Similarly the transistors 586 and 587 are rendered conductive when the transistor 591 is conductive since the collector of the transistor 591 is connected to the base of the transistor 586 by the conductor 616, a resistance 617 and a conductor 618 while its emitter is connected to the base of the transistor 587 by the conductor 619. The transistor 591 in turn is rendered conductive only when both a control transistor 620 and the enable transistor 599 are conductive since the base of the transistor 591 is connected to the common connection of a pair of resistances 622 and 623 which are connectible in series across the batteries 561 and 562 through the conductors 580, 581, 582, 624 and 625, the emitter collector circuit of the transistor 620, the conductor 626, a diode 627, the conductors 628 and 608, the emitter collector circuit of the enable transistor 599, the conductors 610 and 611, the switch 576 and the conductor 575.

The enable transistor 599 is conductive only as long as signals from the command transmitter are being detected by the detector coil 203 so that the drive screw remain in any position to which it has driven at the moment the command transmitter signal fails, as will be explained in greater detail below.

The transistors 598 and 620 are selectively rendered conductive if the difference or error voltage produced by the comparison of the output of the processing circuit 205 which varies in accordance with the repetition rate of, or time delay between, bursts of pulses transmitted from the command transmitter, and the output of a signal processing circuit 208 which varies in accordance with the position of the contact 178 of the potentiometer 170 on its resistance 179 exceeds a predetermined value in one direction or the other. In other words, once the controller device has been moved to a predetermined depth and the contact 178 is set at a corresponding position on the resistance 179, the time delay between the bursts of signals from the command transistor, i.e., the rate of repetition of the bursts must change a certain degree, before the comparator switch circuit 206 will cause energization of the motor in one direction or the other.

The error voltage for selectively rendering the transistors 598 and 620 conductive, as was explained above, is produced by the comparator switch circuit 206 to which voltages corresponding to the output of the detection coil 203 and the setting of the movable contact 178 of the potentiometer 170 are transmitted. The output of the detector coil 203 is transmitted through a band pass filter network which includes a capacitor 630 and an inductance 631 connected in parallel across the conductor 632 and 633 and thus across the detector coil 203. The band pass filter transmits only a narrow band of frequencies, for example, 1 Khz, so that an extraneous noise will not interfere with the operation of the controller device.

The output of the detector coil is applied across the base emitter circuit of the first amplifying transistor 635 of the amplifier 204 one side of the detector coil being connected to the base of the transistor 625 through the conductor 632, a blocking capacitor 636, and a conductor 637 and its other side being connected to the common connection of the emitter of the transistor 635 and a resistance 639 by the conductor 633 which is connected to the conductor 640 connecting the emitter to the resistance. A biasing voltage is applied to the base of the transistor 635 by voltage divider network which includes the resistances 642 and 643 which are connected across the positive voltage conductor 609 and the ground or negative voltage conductor 580 by the resistance 644 and the conductors 645, 646 and 647. The base of the transistor 635 is connected to the common connection of the resistances 642 and 643 since the conductor 637 is connected to the conductor 647. A filter capacitor 648 is connected across the emitter collector circuit of the transistor 635, one side of it being connected to the conductor 645 by a conductor 649 and its other side being connected to the ground conductor 580 by the conductor 650. The emitter collector circuit of the transistor 635 is connected across the conductor 645 and the ground conductor 580 through the conductor 652, a resistance 653, the conductors 654 and 655, the conductor 640, the resistance 639 and the conductor 656.

The output of the first transistor 635 is applied to a second amplifying transistor 660 of the amplifier 204, the common connection of the collector to the transistor 635 and the resistance 653a being connected to the base of the second transistor 660 through the conductors 653 and 645, a blocking capacitor 661, and the conductor 662. A biasing potential is applied to the base of the second amplifying transistor 660 through a voltage divider which includes a pair of resistances 666 and 667 connected in series across the conductor 645 and 580 by the conductors 668, 669 and 670, the conductor 662 being connected to the conductor 669.

The emitter collector circuit of the second amplifying transistor is connected across the conductors 645 and 580 by the conductor 671, a resistance 672, the conductors 673, 674 and 675, a resistance 678 and a conductor 679. A feed back capacitor 689 is connected across the collector base circuit of the second amplifying transistor 660, one side of the capacitor 680 being connected to the conductor 673 by the conductor 681 and its other side being connected to the conductor 662 by the conductor 682. A bypass capacitor 683 is connected between the emitter and the ground conductor, one side thereof being connected to the conductor 675 by a conductor 684 and its other side being connected to the conductor 580 by the conductor 685.

The output of the second amplifier transistor 660 is in turn transmitted to the base of the third amplifying transistor 688 of the amplifier 204 through the conductor 674, a blocking capacitor 689 and the conductor 690. A biasing potential is applied to the base of the third transistor by a voltage divider network which includes the resistances 692, 693 and 694 connected in series across the positive voltage conductor 609 and the ground conductor 580 by the conductors 696, 697, 698, 700 and 701. The base of the transistor 688 is connected to the common connection of the resistances 693 and 694 since the conductor 690 is connected to the conductor 700. A feed back capacitor 703 is connected across the resistances 693 by the conductors 698, 697, 704, 700 and 699.

The emitter collector circuit of the third transistor 688 is connected across the positive voltage conductor 609 and the ground conductor 580 by the conductor 696, the resistance 692, the conductors 697, 705, 706 and 707, the resistance 708 and the conductor 709. A bypass capacitor 710 is connected between the emitter of the third amplifying transistor and the ground conductor 580 by the conductors 706 and 711.

The output of the third amplifying transistor is rectified by a rectifier circuit which includes a transistor 715 whose base is connected to the common connection of the resistance 692 and the collector of the transistor 688 through the conductor 705, a blocking capacitor 716 and the conductors 717 and 718. The rectifier circuit includes a diode 719 connected between the ground conductor 580 and the common connection of the capacitor and the base of the rectifier transistor 715 since one side thereof is connected to the conductor 718 by the conductor 717 and its other side is connected to the ground conductor 580 by the conductor 720.

The output of the rectifying transistor is used to control operation of an output transistor 722 whose output at the common connection 723 of its collector and of a resistance 724 is a positive going pulse whose duration is equal to the duration of the burst of pulses transmitted by the command transmitter which in turn is determined by the position of the contact 331 on the resistance 313 of the multivibrator 224, FIG. 8.

The output of the rectifier circuit is transmitted to the base of the output transistor 722, the base of the transistor 722 being connected to the common connection of the resistances 724 and 726 connected in series with the emitter collector circuit of the transistor 715 across the positive voltage conductor 609 and the ground conductor 580 by the conductors 727, 728, 729, 730 and 731. A filter capacitor 732 is connected between the common connection 723 and the ground conductor 780 by the conductors 733 and 734.

The emitter collector circuit of the output transistor 722 is connected across the positive voltage conductor 611 and the ground conductor 580 by the conductors 610, and 736, the resistance 738 and the conductor 739.

The output of the transistor 722, as long as it is being rendered conductive periodically to provide positive going pulses, is transmitted to the comparator switch circuit 206 through the conductor 740 which is connected to the common connection of the resistance 738 and the collector of the output transistor by a conductor 741. The positive going pulse output of the transistor 722, as long as the 1 KHz bursts of pulses are being transmitted by the command transmitter, is also used to maintain the enable transistor 599 conductive. The positive going pulses are rectified by a rectifier network which includes a diode 744 and a capacitor 745 to provide a positive voltage to cause a control transistor 746 to be conductive, one side of the diode being connected to the conductor 740 through a resistance 746 and its other side being connected to the base of the control transistor 746 by a conductor 747.

The emitter collector circuit of the control transistor 746 of the enable circuit is connected across the positive voltage conductor 609 and the ground conductor 580 by a conductor 750, a resistance 751, conductors 752 and 753, a resistance 754, and conductors 755 and 756. The capacitor 745 is connected across the collector base circuit of the transistor, one side thereof being connected by a conductor 757 to the conductor 755 and its other side being connected to the conductor 747. A resistance 759 is connected between the base of the control transistor 746 and the ground conductor by the conductors 758 and 760.

The base of the enable transistor 599 is connected to the common connection of the resistances 751 and 754 since the conductor 753 is connected to the conductor 752. As a result, the emitter collector circuit of the enable transistor is rendered conductive whenever its control transistor 746 is rendered conductive and a biasing potential is applied to the base of the enable transistor.

The positive going pulse output of the output transistor 722 is used to render a transistor 800 conductive, the base of a capacitor discharge transistor 800 being connected to the conductor 740 by a conductor 801, a resistance 802, a conductor 803, a resistance 804 and the conductors 805 and 806 and to the ground conductor through the conductors 806 and 805, a resistance 807 and the conductor 808. The emitter collector circuit of the transistor 800 is connectible across the batteries 561 and 562 since its collector is connected to the positive voltage conductor 611 by a conductor 808, a resistance 809 and conductors 810, 811 and 812, while its emitter is connected to the ground conductor 581.

A time delay circuit which includes a capacitor 816 is used to delay the initiation of conduction of the transistor 800 until a predetermined period of time after the initiation of transmittal of a positive going pulse over the conductor 740, the capacitor having one side connected to the common connection of the resistances 802 and 804, since it is connected by the conductor 817 to the conductor 803, and its other side being connected to the ground conductor 581 by the conductor 819. It will be apparent therefore that each time positive going pulse is transmitted over the conductor 740 from the output transistor 722 the potential at the base of the transistor 800 will rise slowly until the capacitor 816 is charged. As a result, the transistor 800 will be rendered conductive a very short period of time prior to the initiation of transmission of the positive going pulse and then will remain conductive during the remainder of the duration of the positive going pulse.

During each period of conduction of the discharge transistor 800, the positive charge on a capacitor 825 is discharged to ground, one side of the capacitor 825 being connected to the ground conductor 581 by a conductor 826 and its other side being connected to the common connection of the collector of the transistor 800 of the discharge transistor and a resistance 827 by the conductors 828 and 829. The other side of the resistance 827 is connected to the contact 178 of the transduce potentiometer by the conductors 830, 831 and 832, a resistance 833 and a conductor 834. The resistance 179 of the potentiometer is connected across the batteries 561 and 562 since one side thereof is connected to the conductor 811 while its other side is connected to the ground conductor 581 through a conductor 835, the resistance 836, a conductor 837 and a calibrating variable resistance 839. It will be apparent that the resistance of the calibrating resistance 839 may be adjusted by varying the position of its contact 840 thereon.

It will be apparent that during each period of nonconduction of the discharge transistor 800, the capacitor 825 is charged to a positive voltage. The value of the capacitor 825 is so chosen that it is not fully charged during the longest time delay or time interval between the control pulses transmitted by the output transistor 722 so that the peak positive voltage to which the capacitor 825 may be charged during any period of nonconduction of the discharge capacitor 800 will vary in accordance with the duration of such period.

The peak positive voltage to which the capacitor 825 is charged is sampled immediately prior to the initiation of conduction of the transistor 800 by a sampling circuit 840a which includes a transistor 841 whose base is connected to the conductor 740 through a blocking capacitor 842, the conductor 843, a resistance 844 and a conductor 845. A biasing potential is applied to the base of the sampling transistor 841 through a resistance 846, one end of which is connected to the ground conductor 581 and whose other end is connected to the conductor 845.

Since no time delay circuit is associated with the transistor 841 it will be rendered conductive immediately upon the transmittal of a positive going pulse over the conductor 740 and will be conductive during the period of charging of the blocking capacitor 842 so that the emitter collector circuit of the sampling transistor will be rendered conductive a short period of time prior to the initiation of conduction of the discharge transistor 800. The time interval during which the condenser 842 is charging is such that the transistor 841 is rendered nonconductive at the same time or immediately prior to the instant the transistor 800 is rendered conductive.

The emitter collector circuit of the sampling transistor is connectible across the positive voltage conductor 811 and the ground conductor 581 through the emitter collector circuits of the transistors 851 and 852 of a first differential amplifier 853 and the transistors 854 and 855 of a second differential amplifier 856.

The emitters of the transistors 851 and 852 are connected to the ground conductor 581 through the conductors 857, 858, a resistance 859, the conductors 860 and 861, the emitter collector circuit of the sampling transistor 841 and a conductor 862. The collector of the transistor 851 is connected to the positive voltage conductor 811 through a conductor 868, a resistance 859 and a conductor 870.

The emitters of the transistors 854 and 855 are also connected to the ground conductor 581 through the emitter collector circuit of the transistor 841 being connected to the collector of the sampling transistor 841 through the conductors 872 and 873, a resistance 874 and the conductor 861.

The first differential amplifier 853 controls the operation of a flip flop circuit 877 which includes the pair of transistors 878 and 879. The emitters of the flip flop transistors 878 and 879 are connected to the positive voltage conductor 811 by the conductors 881 and 882. The collector of the transistor 878 is connected to the ground conductor 581 through a conductor 884, a resistance 885 and a conductor 886 while the collector of the transistor 879 is connected to the ground conductor 581 by a conductor 887, a resistance 888 and a conductor 889.

The base of the transistor 878 is connected to the common connection of the resistance 869 and the collector of the transistor 852, being connected to the conductor 868 by the conductors 890 and 891, and is connected to the ground conductor through the conductors 890 and 891, a resistance 892, the conductors 893, 894 and 887, the resistance 888 and the conductor 889.

The base of the second transistor 879 of the first flip flop is connected to the common connection of the collector of the transistor 851 and the resistance 865 being connected to the conductor 864 by the conductors 995 and 996, and is connected to the ground conductor 581 by the conductors 995 and 996, a resistance 897 and the conductors 898, 899 and 885, the resistance 885 and the conductor 886. It will be apparent that the flip flop 877 is of a conventional type and that when the transistor 878 is rendered non-conductive it causes the other transistor 877 to be rendered conductive and the transistor 877 will remain conductive until the transistor 878 is rendered conductive.

The flip flop transistor 878, with the transistor 901 of a second flip flop 902, controls operation of the transistor 620, which may be termed the "dive transistor", the common connection of its collector and the resistance 885 being connected to the common connection of the base of the transistor 620 and a resistance 903 through the conductors 906 and 907. The resistance 903 is connected between the conductor 907 and the ground conductor 581 by the conductors 908 and 909.

Similarly, the second transistor 879 of the flip flop 877, together with the second transistor 911 of the second flip flop 902, controls the operation of the transistor 598, which may be termed the "surface transistor", since the common connection of its collector and the resistance 888 is connected to the common connection of the base of the transistor 598 and a resistance 912 by the conductors 887, 894 and 893, an isolating diode 914, and the conductors 915 and 916. The resistance 912 is connected between the base of the transistor 598 and the ground conductor 581 by the conductors 917a and 913.

The operation of the second flip flop 902 is controlled by the second differential amplifier 856, the common connection of the base of the first transistor 901 and a resistance 917 being connected to the common connection of the collector of the transistor 855 and a resistance 918 by a conductor 919 one of whose ends is connected to a conductor 928 connected to the base of the transistor 901. The other end of the conductor 919 is connected to a conductor 921 which connects the collector of the transistor 855 to one side of the resistance 918, the other side of the resistance 918 being connected by a conductor 923 to the positive voltage conductor 811. The second transistor 911 of the second flip flop 902 has the common connection of its base and a resistance 924 connected to the common connection of the collector of the transistor 854 and a resistance 926 by a conductor 929. The conductor 929 is connected at one end to the resistance 924 and to the base of the transistor 911 by a conductor 930 while its other end is connected to a conductor 931 which connects the collector of the transistor 854 to one side of the resistance 926. The other side of the resistance 926 is connected to the positive voltage conductor by a conductor 932.

The emitters of the flip flop transistors 901 and 911 are connected to the positive voltage conductor 811 by the conductors 939 and 935.

The collector of the transistor 901 is connected to the ground conductor 581 by the conductor 937, a resistance 938 and a conductor 934 while the collector of the transistor 911 is connected to the ground conductor by a conductor 941, a resistance 942 and a conductor 943. The operation of the dive transistor 620 is controlled by the transistor 901 since the common connection of its collector and the resistance 938 is connected to the base of the transistor 620 by the conductors 937, 945, and 946, an isolating diode 947 and the conductors 906 and 907. Similarly, the transistor 911 controls the surface transistor 598 since the common connection of its collector and the resistance 942 is connected to the base of a transistor 598 by the conductors 941, 948 and 949, an isolating diode 950 and the conductors 915 and 916.

The voltage applied to the bases of the transistors 851 and 854 of the differential amplifier 853 and 856, respectively, is the voltage at the summin junction 954 or common connection of the resistances 833 and 827 since the base of the transistor 851 is connected to the summing junction by the conductor 831 and the base of the conductor 854 is connected to the summing junction by the conductor 951. The base of the transistor 852 of the first differential amplifier 853 is connected to the common connection of the resistances 953 and 954 of a voltage divider network which includes the resistances 955, 953, 954 and 956 connected in series across the positive voltage conductor 811 and the ground conductor 581 by the conductors 957, 958, 959 and 960. The resistance 953 is a variable resistance having a contact 961 engageable with the resistance 953 and connected to the conductor 958 by the conductor 962.

The base of the transistor 852 of the first differential amplifier is connected to the common junction of the connection of the resistances 953 and 954 by the conductor 958. The base of the transistor 855 is connected to the common connection of the resistances 954 and 956 by a conductor 964 which is connected to the conductor 959. It will be apparent, therefore, that the biasing potential applied to the base of the transistor 852 of the first differential amplifier 853 moves positive, as determined by the value of the resistance 954, than the biasing potential applied to the base of the second transistor 855 of the second differential amplifier 856 for a purpose to be described below.

The voltage at the summing junction 954 at the periods of time determined by the sampling circuit 840a, varies not only with the charge on the capacitor 825, which in turn varies in accordance with the repetition rate of the periods of conduction of the transistor 800, i.e., the duration of the time period between two successive periods of conduction of the transistor 800, but also with the position of the contact 178 on the resistance 179 of the potentiometer or transducer 170 since the resistance 179 is connected between the positive voltage conductor 811, the resistance 836, the conductor 837 and the resistance 839.

Assuming now that the apparatus 20 is in a state of operation, the cable is being towed horizontally at a predetermined depth below the surface of the water with the diving planes of the controller devices being now substantially horizontal about the vertical axes of their shafts. The axes of pivotal movement of the diving planes are substantially horizontal due to the provision of the floatation means in the forward ends of the shells of the controller devices, the rotational mounting of the shells or controller devices on the cable, the location of the center of gravity of the controller devices below the locations of connection of the controller devices on the cable and the provision of the stabilizer fins 22c on the shells as is conventional and well known in the art.

Assuming now that the command transmitter is transmitting bursts of pulses at a rate commanding or setting a predetermined depth of the controller devices and that the controller devices have reached such predetermined depth after moving downwardly from the preceding depth at which they had been moving in the water, the voltage at the summing junction 954 is now in an intermediate null band or range. At this time the transistors 851 and 852 of the first differential amplifier 853 are non-conductive and conductive, respectively, and the transistors 878 and 879 of the first flip flop 877 controlled thereby are conductive and non-conductive, respectively. The transistors 854 and 855 of the second differential amplifier 856 are conductive and non-conductive, respectively, even through the base of the transistor 854 is at the same potential as the base of the transistor 851 since the base of the transistor 852, due to the provision of the resistance 954, is at a less positive potential than the base of the transistor 851. The transistors 901 and 911 of the flip flop 902, which is controlled by the second differential amplifier are therefore non-conductive, respectively.

Since the transistor 911 is conductive, a positive voltage is applied to the base of the surface transistor 598 through the diode 950 and the transistor 911, and the surface transistor is held non-conductive. Similarly, the dive transistor 620 is held non-conductive by the voltage applied to its base through the diode 905 and the now conductive transistor 878. As a result, the transistors 590 and 591 are non-conductive and hold non-conductive the pair of transistors 572 and 573 and also the pair of transistor 586 and 587 and both sides of the motor are thus disconnected from the batteries 561 and 562.

If the rate of repetition of the bursts of pulses being transmitted by the command transistor is now increased by moving the contact 430 upwardly on the resistance 431, the time periods between successive bursts, and thus the time periods during which the capacitor 825 is charged, are decreased so that the voltage at the summing junction 954, during the sampling periods determined by the sampling circuit, begins to decrease. As this voltage decreases to a value below the null range, the transistor 854 of the differential amplifier 856, to which the summing junction voltage is applied, is rendered non-conductive and the transistor 855 is rendered conductive.

Due to the reversal of the conditions of the states of the transistors 854 and 855 of the second differential amplifier, which control the states of the transistors of the second flip flop 902, the transistor 911 which was conductive is now rendered non-conductive and the transistor 901 which was non-conductive is rendered conductive.

The transistors 878 and 879 of the first flip flop 877 which are controlled by the first differential amplifier 853 will remain in the same condition, i.e., transistor 878 will remain conductive and the transistor 879 will remain non-conductive since the transistor 851, to whose base is applied the decreasing voltage at the summing junction, is already non-conductive. As result, since the transistors 911 and 879 are now both non-conductive, the voltage at the base of the surface transistor 598 decreases and it is rendered conductive.

Dive transistor 620, however, remains non-conductive since it is now connected to the positive voltage conductor 811 through the now conductive emitter collector circuits of the transistor 878 and of the transistor 901.

When the surface transistor 598 is rendered conductive, it causes the transistor 590 to be rendered conductive and this in turn causes the pairs of transistors 572 and 573 to be conductive. The terminal 570 of the motor 154 is thus connected to the positive side of the battery 561 through the emitter collector circuit of the transistor 572 and to the negative side of the battery 562 through the emitter collector circuit of the transistor 573. The motor 154 is now operated in a direction to pivot the diving planes of the controller devices in such direction to cause the controller devices to move upwardly in the water. The potentiometer contact 178 is simultaneously moved upwardly on the resistance 151 during this operation of the motor tending to raise the voltage at the summing junction during the periods of time sampled by the sampling circuit. As the contact 178 moves upwardly on the resistance 179 and the voltage at the summing junction 954 again rises into the null voltage range, the transistor 854 of the second differential amplifier is again rendered conductive and its other transistor 855 is again rendered non-conductive. As a result, the motor 154 is again disconnected from the batteries and will remain de-energized as long as the repetition rate of the bursts of pulses being transmitted by the command transmitter remains constant or unchanged.

Should the operation of the command transmitter be interrupted, as by operation of the inhibit circuit 227, during the periods of time of operation of such equipment as hydrophones which are secured to the cable, the enable circuit which includes the transistor 599 prevents operation of the motor 154 in either direction since the transistor 599 is rendered non-conductive and thus disconnects the emitters of the surface and dive transistors from the positive side of the battery 561.

If it is thereafter desired to cause the depth controller devices to move lower in the water, the contact 430 of the command transmitter is moved downwardly on the resistance 431 to increase the time intervals between the successive bursts of pulses transmitted by the command transmitter. As a result, since the time intervals between successive periods of conduction of the transistor increases, the voltage at the summing junction 954 at the periods of operation of the sampling circuit 848a increases. As the voltage at the summing junction increases to a value above the null voltage range, the transistor 851 of the first differential amplifier, which was non-conductive, is rendered conductive while transistor 854 of the second differential amplifier which was already conductive, remains conductive. When the transistor 851 is rendered conductive, it causes the transistor 879 which was nonconductive, to be rendered conductive which in turn causes the transistor 878 to become non-conductive. As a result, since both the transistor 879 of the first flip flop and the transistor 911 of the second flip flop are now non-conductive, the dive transistor 620 is rendered conductive and causes the transistor 591 to be rendered conductive which in turn causes the transistor 591 to be rendered conductive which in turn causes the transistors 586 and 587 to be rendeted conductive. Since both the transistors 586 and 587 are now conductive, the terminal 571 is now connected to the positive side of the battery 561 through the transistor 586 and to the negative side of the battery 562 through the transistor 587.

The motor 154 now operates to pivot the diving planes of the controller devices in such direction as to cause the controller devices to dive or move downwardly in the water as the cable is towed therethrough. Simultaneously, the contact 178 is moved downwardly on the resistance 179 so that the effective voltage at the summing junction 954 at the instants of operation of the sampling circuit 840a beings to drop down again to null voltage range. As this voltage thus drops back into the null voltage range, the transistor 851 is again rendered non-conductive and the second transistor 879 is renderend conductive to cause the transistor 878 to be rendered conductive and thus cause the transistor 879 to be rendered non-conductive. As a result, the motor will again cease operation as the depth controller devices reach the commanded or set depth.

It will be apparent of course that if the rate control motor 520 is operated, the repetition rate of the bursts of pulses transmitted by the command transmitter will either increase or decrease, as determined by the switch 525, in accordance with the speed of operation of the motor 520 which in turn is determined by the setting of the contact 530 on the potentiometer resistance 541.

Due to the fact that the command signals are in effect, the duration between bursts of pulses of a predetermined frequency, there is less likelihood of faulty operation of the controller devices by spurious noises produced by other equipment than if the signal were in the form of variations in the amplitude or the duration of the bursts themselves of the pulses of the predetermined frequency.

It will be apparent of course that the circuit between the signal carrying conductor connected to the output terminal 222 of the output of the command transmitter and its other output terminal 223 is through the water since the ground of the command transmitter circuit is connected to the hull of the vessel or a suitable electrode and the ground of the controller devices is also connected to the water through either the shell or a suitable electrode.

The batteries 561 and 562 may be recharged while in the controller devices due to the provision of a terminal 990 to which one side of a charging circuit may be connected, the terminal 990 being connected to the positive side of the battery 562 through the conductors 991, 992 and 574. The other or negative side of the charging circuit is of course connected to the ground of the controller device which may be its shell or if desired, a second terminal 993 which is connected to the ground conductor 580 and thus to the negative side of the battery 562.

In order to minimize the possibility of malfunction of the controller device, the surface and dive transistors can be rendered conductive only if both of the flip flops 877 and 902 are in their proper states or conditions since the surface transistor 598 can be rendered conductive only if the transistors 879 and 911 are both non-conductive and the dive transistor 620 can be rendered conductive only if the transistors 878 and 901 are both non-conductive. As a result, should there be a failure of either flip flop or either differential amplifier, the controller devices will neither move downwardly or upwardly from the last commanded depth, the danger of diving too deeply or of surfacing of the controller devices thus being precluded.

If desired of course, the signals of the command transmitter could be transmitted through a separate signal conductor which could extend from the vessel to the vicinity of the controller devices or could be transmitted wireless through a suitable antenna.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A depth controller device for a tow cable including: a body securable to the tow cable; diving planes mounted on the body for pivotal movement about a pivot axis; operator means on said body comprising a cylindrical housing and a piston movable reciprocally in said housing; biasing means in said cylindrical housing biasing said piston for movement in one direction; said piston having a surface exposed to the pressure of the water in which said controller device is immersed whereby said piston is biased by the pressure of the water for movement in a second direction opposite said one direction; connector means connecting said operator means to said diving planes whereby said diving planes are pivoted in one direction when said piston moves in said one direction and are pivoted in a second direction when said piston moves in said second direction; said biasing means comprising spring means and compression means for compressing said spring means, said spring means being disposed in said cylindrical housing between said compression means and said piston; moving means comprising driving means for moving said compression means toward and away from said piston to vary the force with which said spring means yieldably resists movement of said piston toward said compression means, said driving means comprising reversible motor means in said body and a drive screw engaged with said compression means for moving said compression means selectively in opposite directions along said drive screw, control means for controlling operation of said motor means, and transducer means in said body operatively associated with said drive means providing an electric quantity which varies in accordance with the longitudinal position of said compression means relative to said drive screw.

2. The controller device of claim 1, wherein said control means comprise detector means for detecting command signals and circuit means responsive to the output of said detector means and said electric quantity for controlling operation of said motor means to cause said drive means to move said compression means in accordance with the commmand signals and stopping operation of said motor means when said compression has moved to position relative to said drive screw determined by the command signals.

3. The controller device of claim 2, wherein the command signals are bursts of pulses of a predetermined frequency, duration of the periods of time between successive bursts varying to indicate the commanded depth, and wherein said circuit means comprises means for providing a signal voltage which varies in accordance with the duration of said periods of time, comparing means for comparing said signal voltage with said electric quantity, and means responsive to the output of said comparing means for controlling operation of said motor means.

4. The controller device of claim 3, wherein said control means includes sampling means operatively associated with said means for providing a signal voltage for causing said signal voltage to be transmitted to said comparing means only at substantially the end of each of said periods of time.

5. The controller device of claim 4, wherein said control means comprises enabling means operatively associated with said detector means and said circuit means for permitting operation of said circuit means only during the periods of time during which said pulses are being transmitted.

6. A depth controller device for a tow cable including: a body securable to the tow cable; diving planes mounted on the body for pivotal movement about a pivot axis; operator means on said body comprising a cylindrical housing and a piston movable reciprocally in said housing; biasing means in said cylindrical housing biasing said piston for movement in one direction; said piston having a surface exposed to the pressure of the water in which said controller device is immersed whereby said piston is biased by the pressure of the water for movement in a second direction opposite said one direction; connector means connecting said operator means to said diving planes whereby said diving planes are pivoted in one direction when said piston moves in said one direction and are pivoted in a second direction when said piston moves in said second direction; said biasing means comprising spring means and compression means for compressing said spring means; moving means for moving said compression means to vary the force with which said spring means resists movement of said piston in said second direction, said moving means comprising reversible motor means and driven means driven by said motor means for moving said compression means selectively in opposite directions; and transducer means operatively associated with said driven means for providing an electric quantity which varies in accordance with the position of the driven means.

7. The controller device of claim 6, wherein said transducer means comprises a variable resistance.

8. The controller device of claim 7, wherein said control means comprises detector means for detecting command signals and circuit means responsive to the output of said detector means the value of the resistance of said variable resistance for controlling operation of said motor means to cause said motor means to move said compression means in accordance with the command signals and stopping operation of said motor means when said compression means is moved to position determined by the command signals.

* * * * *